United States Patent

[11] 3,617,954

[72] Inventors Ralph Levy
Newton, Mass.;
John David Rhodes, Guisley, England
[21] Appl. No. 35,695
[22] Filed May 8, 1970
[45] Patented Nov. 2, 1971
[73] Assignee Microwave Development Laboratories, Inc.
Needham Heights, Mass.

[54] SEMILUMPED COMB LINE FILTER
3 Claims, 13 Drawing Figs.

[52] U.S. Cl. 333/73, 333/84 M
[51] Int. Cl. H03h 7/10
[50] Field of Search 333/73, 6, 84, 84 M, 10

[56] References Cited
UNITED STATES PATENTS

| | | | |
|---|---|---|---|
| 3,408,599 | 10/1968 | Horton et al. | 333/73 |
| 3,391,356 | 7/1968 | Bolljahn | 333/73 |
| 3,327,255 | 6/1967 | Bolljahn | 333/73 |
| 3,525,954 | 8/1970 | Rhodes | 333/73 |
| 3,505,618 | 4/1970 | McKee | 333/73 |

*Primary Examiner*—Herman Karl Saalbach
*Assistant Examiner*—C. Baraff
*Attorney*—Louis Orenbuch

ABSTRACT: A band-pass filter for use in the VHF and UHF regions employs a digital line in which the length of the digits can be as short as one twelfth of the wavelength at the filter's midband frequency to permit the filter structure to be small compared to the wavelengths in the pass band while obtaining the advantage of the low loss of a digital line. The filter has an elliptic function and is particularly suitable for narrow band applications. The digital line is disposed between and spaced from a pair of ground plane plates and the line is formed by parallel digits which are short circuited at one end in the manner of a "comb" line. At the opposite end is a network of lumped element capacitors interconnecting adjacent digits of the line and coupling the end of each digit to ground.

SEMILUMPED COMB LINE FILTER

FIELD OF THE INVENTION

This invention relates in general to passive apparatus for filtering electrical signals to permit only those signals in a selected band to pass. More particularly, the invention pertains to a compact, elliptic function filter which is derived from a lumped element, band-pass prototype by replacing the lumped inductors, which contribute the main loss, with a comparatively low-loss distributed network. In the filter, the low loss distributed network is a digital "comb" line in which the digits can be as short as one twelfth of the wavelength at the filter's midband frequency. A network of lumped capacitors is associated with the digital line in a manner giving the desired filter characteristics.

BACKGROUND OF THE INVENTION

At VHF and UHF frequencies, filters using lumped components have high dissipation losses that are mainly caused by the low Q of the inductors, and this is so even where the inductors consist of helical lines. One of the most compact band pass filters is the stepped digital filter described in U.S. Pat. No. 3,525,954. The stepped digital filter there described is intended for use in the microwave region of the frequency spectrum and is therefore of the fully distributed type. That is, the resistance, inductance and capacitance of the filter are distributed over the entire structure in conformity with the techniques customarily used at microwave frequencies. The stepped digital filter, in the fully distributed form, becomes inordinately large if it is made for lower frequencies because the digits used in that filter are $\lambda/4$ in length. For example, at a frequency of 150 mHz. the digits would have to be 50 cm. in length to retain the fully distributed form. The size of such a filter usually precludes its use for applications in the UHF and VHF regions.

OBJECTIVE OF THE INVENTION

The principal objective of the invention is to provide, for frequencies below the microwave region, a reasonably compact band pass filter having equiripple pass and stop band characteristics (i.e., having elliptic function characteristics). The main application contemplated for the invention is in providing low loss, narrow band filters for use in the VHF and UHF regions of the electromagnetic spectrum.

THE INVENTION

The invention is an improvement upon the fully distributed stepped digital filter which retains the low loss capability of the distributed form while permitting as much as a threefold reduction in the length of the digits. In the invention, the inductors of the lumped element prototype are replaced by a digital "comb" line, the length of whose digits can be as little as one twelfth the wavelength of the midband frequency. The capacitors of the lumped element prototype are, in the invention, realized directly in lumped form by capacitors of high Q. These capacitors interconnect adjacent digits of the line and couple the ends of the digits to ground. The Q of the inductive part of the filter remains high and as the capacitors are high Q units, the loss of the filter is low compared to conventional lumped element filters.

THE DRAWINGS

The invention, both as to its construction and mode of operation, can be better understood from the exposition that follows when it is considered in conjunction with the appended drawings in which.

Figure 3:
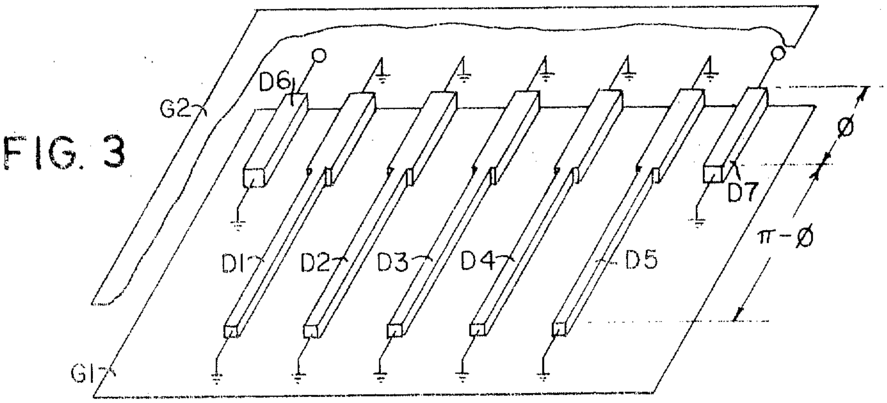
Figure 4:
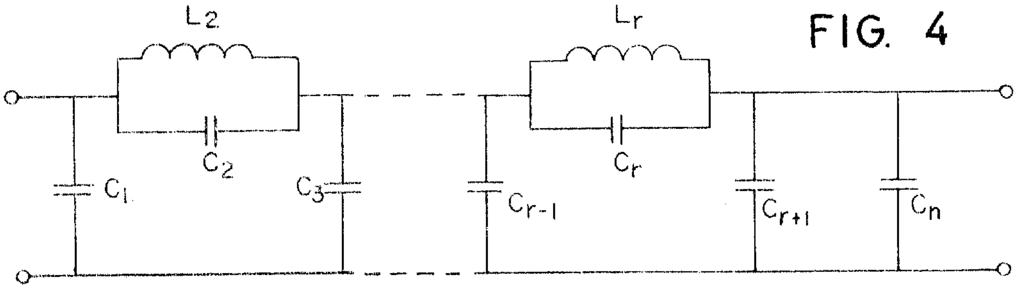
Figure 5:
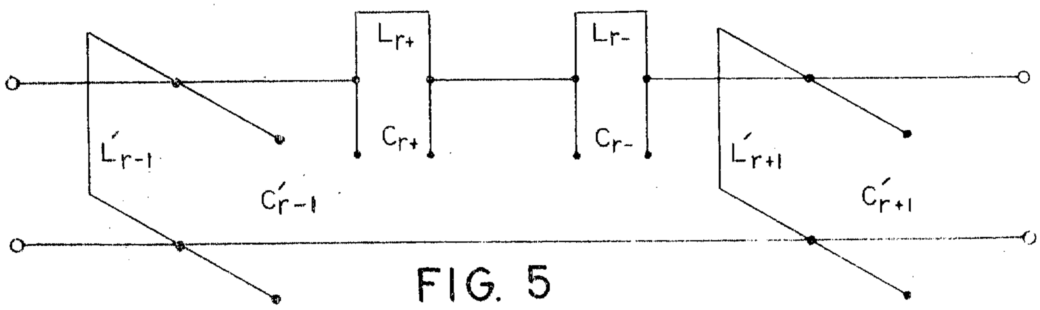
Figure 6A:
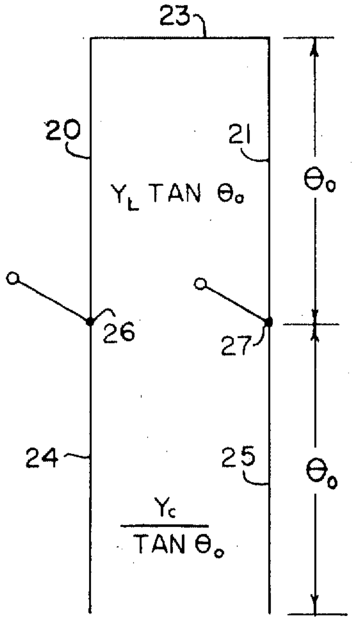
Figure 6B:
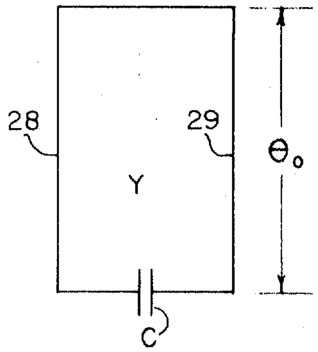
Figure 7:
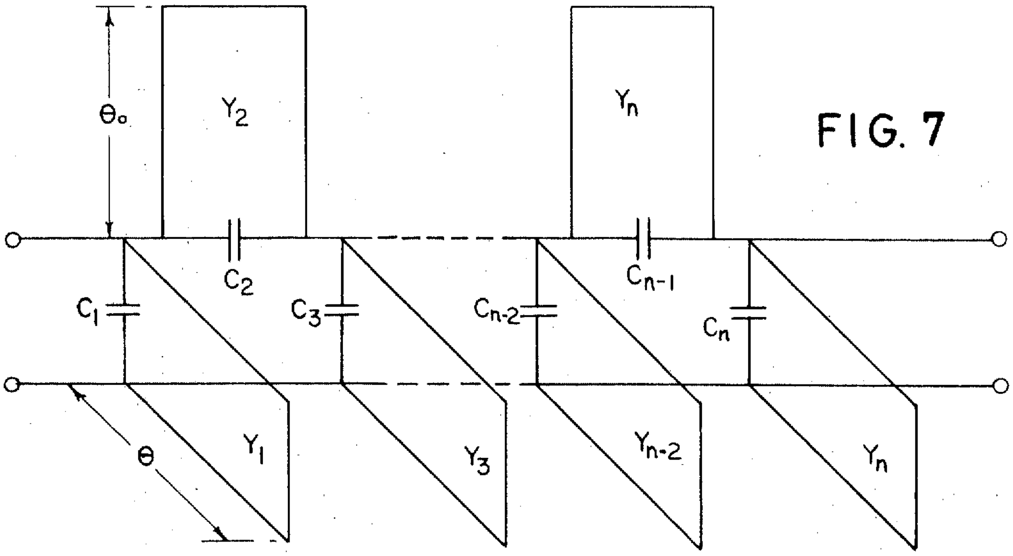
Figure 8:
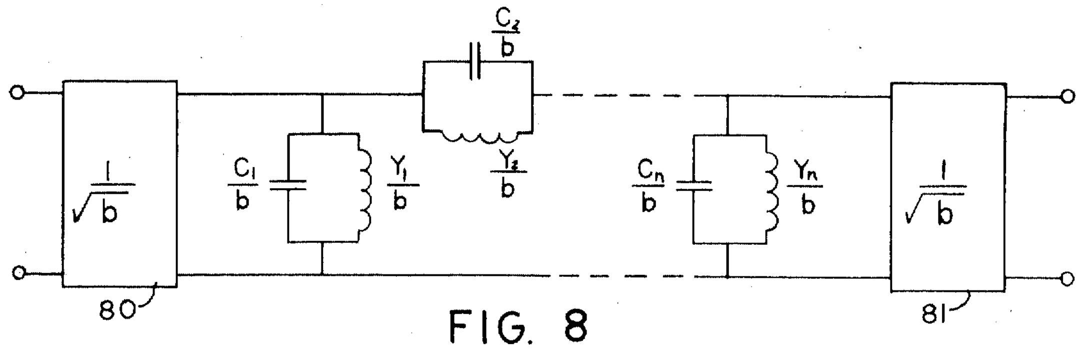
Figure 9A:
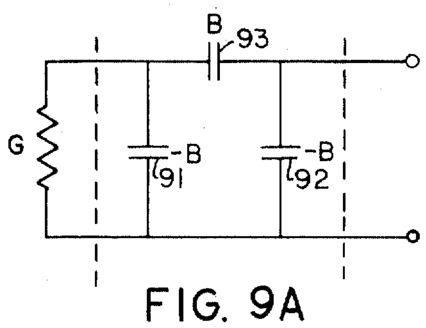
Figure 9B:
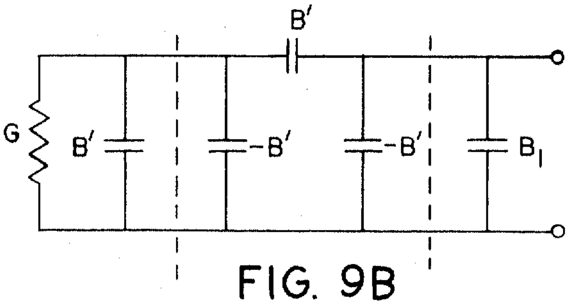

FIG. 3 schematically depicts a half-wave, stepped, digital, elliptic filter;

FIG. 4 symbolically depicts the lumped prototype of a low-pass, odd ordered, elliptic function filter;

FIG. 5 depicts a filter section generated from a basic section of the lumped prototype filter by a resonating technique;

FIG. 6A shows a typical stub pair of the FIG. 5 filter section;

FIG. 6B shows an equivalent circuit employing a lumped capacitor;

FIG. 7 shows the filter arrangement obtained by utilizing the FIG. 6 equivalent circuit in place of the stub pairs;

FIG. 8 schematically depicts the addition to the filter of ideal admittance inverters;

FIG. 9A depicts a $\pi$-network approximation of the ideal admittance inverter;

FIG. 9B illustrates a modification of the FIG. 9A $\pi$-network; and

Figure 10:
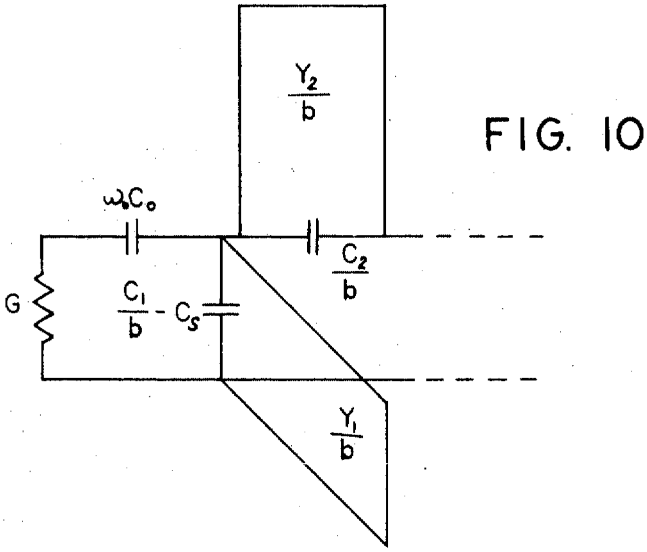

FIG. 10 schematically illustrates the final development of the series capacitance input arrangement.

THE EXPOSITION

Figure 1:
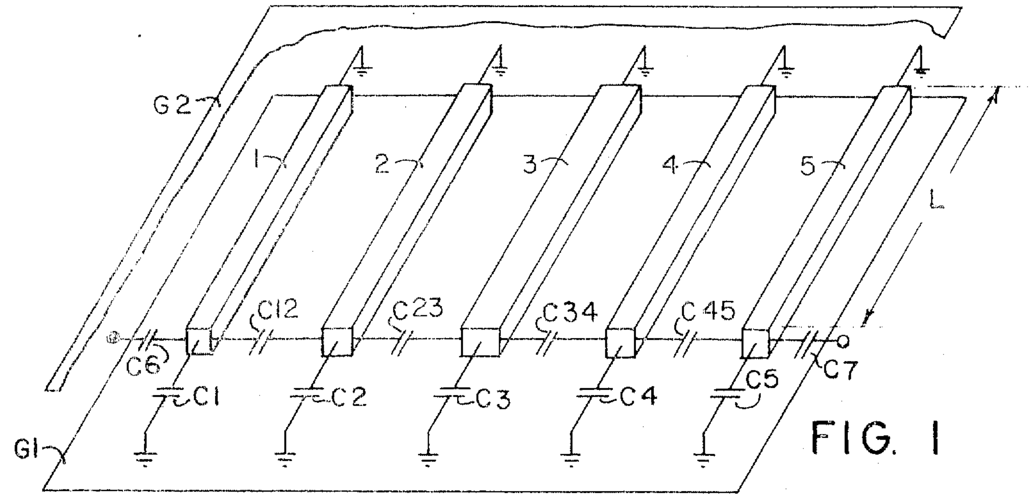
FIG. 1 shows the scheme of the invention in simplified form.

The invention is schematically shown in a simplified form in FIG. 1. An array of parallel digits 1, 2, 3, 4, 5 is disposed midway between a pair of ground planes G1 and G2. Each digit has one end directly connected to the ground potential of planes G1 and G2. The array of digits, in effect, forms a "-comb" line inasmuch as the corresponding ends of all the digits, being at the same potential, can be physically joined together. The opposite end of each digit, which is here termed the "open circuited end," is capacitively coupled to ground by one of capacitors C1, C2,...C5. Further, each pair of adjacent digits, at their open circuited ends, are capacitively coupled by a capacitor $C_{12}$, $C_{23}$, $C_{34}$, or $C_{45}$. The input and output connections to the digital array are, preferably, made through capacitors $C_6$ and $C_7$ which are connected to the terminal digits 1 and 5, respectively. The digits 1, 2,...5 are all of the same length L and that length can be as little as one twelfth of the wavelength at the filter's mid-band frequency.

Figure 2A:
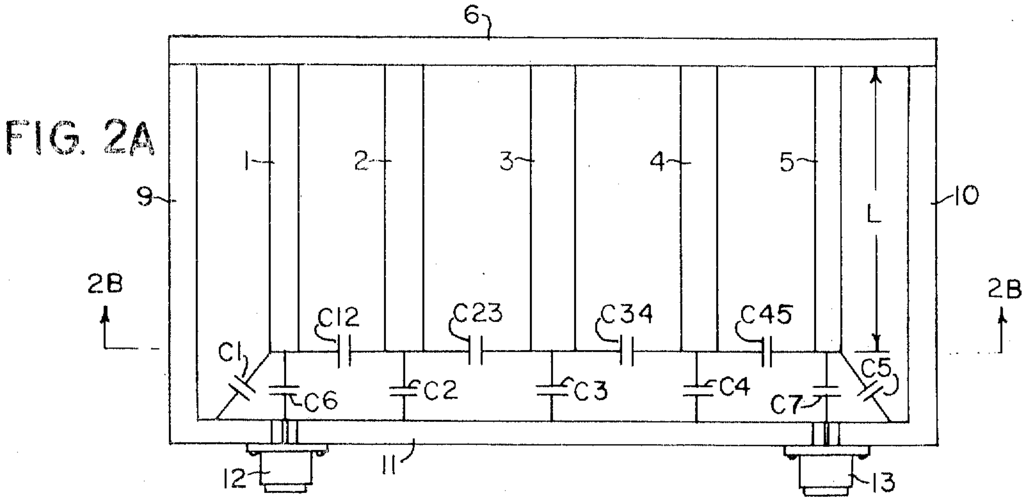
FIG. 2A illustrates an embodiment of the invention having its upper ground plane plate broken away to expose the interior of the filter and shows the capacitors in symbolic form.
Figure 2B:
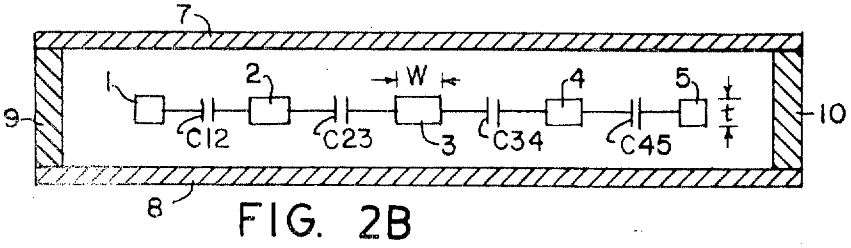
FIG. 2B is a sectional view in elevation taken along the parting plane B—B in FIG. 2.

In a practical embodiment of the invention, the comb line, as shown in FIG. 2A, is formed by digits 1, 2, 3, 4, 5, each of which is secured at one end to a rail 6 and protrudes from it in the manner of a tooth and a comb. In the assembled filter, the digital comb line is completely enclosed in a structure that is at a common (i.e., ground) potential except for the input and output connections. The enclosure, as shown in FIGS. 2A and 2B, is a rectangular chamber formed by ground plane plates 7, 8, side rail 6, and walls 9, 10, 11. The digits are electrically conductive bars of rectangular cross section and, as indicated in FIG. 2B, are of uniform thickness t. The digits, in the general case, are not uniformly spaced apart and are of different widths W. The input and output connections to the terminal digits 1 and 5 of the comb line are made through capacitors C6 and C7. Capacitor C6 couples the inner conductor of coaxial connector 12 to the open circuited end of terminal digit 1 and capacitor C7, in similar manner, couples the inner conductor of coaxial connector 13 to the open circuited end of terminal digit 5. Each digit has its open circuited end coupled to ground through a capacitor C1, C2,...C5 and the open circuited ends of adjacent digits are capacitively coupled by a capacitor C12, C23, C34, or C45. To facilitate tuning of the filter, the capacitors may be of the variable capacitance type.

The filter of FIGS. 1, 2A and 2B is termed a "semilumped" elliptic filter inasmuch as the digital comb line is a network in which resistance, inductance, and capacitance are distributed whereas the capacitors are lumped.

The mathematical design procedure for the semilumped elliptic filter can be derived by transformation of the quarter wave, stepped, digital, elliptic filter described in the aforesaid U.S. Pat. However, the mathematical design procedure for the semilumped filter is simplified where consideration is given to the theoretical design procedure for the half-wave stepped digital elliptic filter set forth in U.S. Pat. No. 3,582,841. The half-wave stepped digital elliptic filter traces its origin to the quarter-wave stepped digital elliptic filter and it is intended that the disclosures of both of the above cited applications be here incorporated in their entirety by reference.

FIG. 3 schematically illustrates the half-wave stepped digital elliptic filter disclosed in U.S. Pat. No. 3,582,841. In the half-wave stepped digital elliptic filter, the digits D1, D2, D3, D4, and D5 are each one half wavelength ([/2) long, where λ is the wavelength at the filter's midband frequency. The digits are short circuited at both ends and thereby form a "ladder" digital line. At a distance Φ from one end, each digit is stepped in impedance by an alteration in its width W. The input and output connections to the digital ladder line are made by transformer action through digits D6 and D7 located adjacent to the terminal digits D1, D5 of the ladder line.

Initially, the design procedure for the semilumped filter is identical to that disclosed in U.S. Pat. No. 3,582,841. Commencing, as in the above cited patent, with the low-pass, prototype, lumped constant, elliptic function filter here shown in FIG. 4, the element values for the prototype can be obtained from "Der Entwurf Von Filtern mit Hilfe des Kataloges Normierter Tiefpasse" by R. Saal, Backnay/Wurtemberg, W. Germany, Telefunken G.M.B.H., 1964, or from one of the other sets of tables that are now available. The following low pass to distributed band pass transformation is applied $$\omega \rightarrow a\left[\frac{\tan\theta}{\tan\theta_0}-\frac{\tan\theta_0}{\tan\theta}\right] \qquad (1)$$

where $\theta = \omega e/v$ $l$ = length of commensurate distributed elements $v$ = velocity of propagation and $a$ is a bandwidth scaling factor that is dependent upon the filter's band edge frequencies. The typical π-section of the prototype is transformed to the resonated distributed section shown in FIG. 5 where the stubs have a common electrical length $\theta$, and $\theta_o$ is the mid band value. The value taken by the bandwidth scaling factor is later considered herein. The immittance values of the stubs in FIG. 5 are given by equations (3) and (4) in the above cited J. D. Rhodes patent. At this point, the filter is seen to consist of a cascade of stub pairs connected in series or parallel with the main line. A typical stub pair, as shown in FIG. 6A, consists of stubs 20, 21 that are short circuited at end 23, and stubs 24, 25 that are open circuited at one end, the stubs being connected at nodes 26, 27. Letting $Y_L \tan\theta_o$ and $Y_c/\tan\theta_o$ be the characteristic admittances of the short circuited and open circuited stubs, respectively, of the typical stub pair indicated in FIG. 6A, the input admittance of the combination at their common node is $Y_c \tan\theta/\tan\theta_0 - Y_L \tan\theta_o/\tan\theta$ The stub pair of FIG. 6A is now to be replaced by the equivalent circuit of FIG. 6B having short circuited stubs 28, 29 of characteristic admittance Y in parallel with a lumped capacitor C. The equivalent circuit of FIG. 6B has nodal admittance $\omega C - Y/\tan\theta$(3)

Equating expressions (2) and (3) at the mid-band frequency $\omega_o$ and also equating their derivates (or susceptance slope parameters) at mid-band, gives the following expression for C and Y:

$$\omega_0 C=\frac{2Y_c}{1+\dfrac{\sin 2\theta_0}{2\theta_0}} \qquad (4)$$

$$Y\cot\theta_0=Y_L+Y_0\,\frac{1-\dfrac{\sin 2\theta_0}{2\theta_0}}{1+\dfrac{\sin 2\theta_0}{2\theta_0}} \qquad (5)$$

Equations (4) and (5) are applied to each stub pair in the distributed network of FIG. 5, resulting in the filter shown in FIG. 7 where the stubs represent distributed elements and the capacitors represent lumped elements. Formally, this consists of a distributed admittance matrix -[Y] cot θ connected in parallel with a lumped capacitor network defined by the admittance matrix ω[C]. The matrices [Y ] and [C] are given by equations (4) and (5) when rewritten in matrix form, where $[Y_L]$ and $[Y_c]$ are the characteristic admittance matrices (8) and (9) respectively in U.S. Pat. No. 3,525,954.

The theoretical design procedure is now complete, except for the derivation of the bandwidth scaling factor $a$ and the means for transforming the admittance level. To illustrate the derivation of the bandwidth scaling factor, the factor a is here derived for the narrow band case. By considering equations (1), (2), (4), and (5) for a typical shunt resonant element, for which the condition $Y_L = Y_c$ always applies, it is evident that an excellent approximate expression for the low-pass to band-pass frequency transformation is $$\omega' \rightarrow \frac{2a}{1+\dfrac{2\theta_0}{\sin 2\theta_0}}\left(\frac{\omega}{\omega_0}-\frac{\tan\theta_0}{\tan\theta}\right) \qquad (6)$$

$$\Delta\omega'=\frac{2a}{1+\dfrac{2\theta_0}{\sin 2\theta_0}}\,(1+\theta_0\tan\theta_0\operatorname{cosec}^2\theta_0)\frac{\Delta\omega}{\omega_0} \qquad (7)$$

$$\Delta\omega'=2a\,\frac{\Delta\omega}{\omega_0}$$

Hence, to a first order, the filter is symmetrical on a direct frequency scale, so that we have $$a=\frac{\omega_0}{\omega_1-\omega_2} \qquad (8)$$

where $$\omega_0=\frac{\omega_2+\omega_1}{2} \qquad (9)$$

$\omega_1$ and $\omega_2$ being the band edges of the filter.

Coupling into the semilumped filter may be carried out using redundant unit elements in the form of short-circuited transformer digits, as described in connection with FIG. 5 of U.S. Pat. No. 3,525,954. However, series capacitance coupling is preferred for the semilumped filter because it is simpler to achieve and the coupling capacitors occupy less space than transformer digits.

Assuming that admittance scaling by a factor $b$, greater than unity (>1), is required, it can be achieved, as schematically depicted in FIG. 8, by the addition of ideal admittance inverters 80, 81 of admittance $B=1/b$. In practice, the ideal admittance inverter can be approximated by employing one of the circuits shown in FIG. 13 of the monograph "Direct-Coupled-Resonator Filters" by S. B. Cohn, Proceeding of the Institute of Radio Engineers, Volume 45, Feb. 1957, pp. 187–196. The π-network of capacitors 91, 92, 93, here shown in FIG. 9A, has been chosen as an example. One of the negative susceptances (−B) can be absorbed into the first positive susceptance of the filter network, but this is not the case with the susceptance −B adjacent to the load conductance G. Therefore, the FIG. 9A circuit must be modified to the arrangement depicted in FIG. 9B by adding shunt susceptance B′ to the load side of the admittance inverter, adding shunt susceptance $B_1$ to the filter side of the admittance inverter, and changing the inverter's admittance to B′. Equating the mid-band output admittance of the FIGS. 9A and 9B circuits gives the identity $$\frac{B^2}{G}=\frac{B'^2}{G+jB'}+jB_1 \qquad (10)$$

leading to the following expressions for $B_1$ and $B'$ $$B_1=\frac{B'^3}{G^2+B'^2} \quad (11)$$

$$\frac{B^2}{G}=\frac{B'^2G}{G^2+B'^2}$$

or $$B'=\frac{B}{\sqrt{1-\frac{B^2}{G^2}}} \quad (12)$$

The susceptance to be subtracted from the first shunt capacitor of the main network is therefore $$B_s=B_1-B'$$

$$B_s=B\sqrt{1-\frac{B^2}{G^2}} \quad (13)$$

The final input circuit, shown in FIG. -), CONTAINS THE series capacitance coupling $\omega_oC_0=B'$, given by equation (12) above, and the first shunt capacitor is $C_1/b - C_s$, where $\omega_oC_s=B_s$, given by equation (13). This input arrangement is an approximation to the ideal admittance inverter and gives excellent results for narrow band filters.

The invention can be embodied in various forms and it is not intended that the scope of the invention be limited to the precise apparatus here illustrated or described. For example, it is apparent to those skilled in the art of digital line filters that the digits of the comb line need not be five in number, as illustrated, but can be of any number and further the digits need not be of rectangular cross section but can be circular or of other shapes. It is intended, therefore, that the invention be delimited by the appended claims and include those structures that do not fairly depart from the essence of the invention.

What is claimed is:

1. A band-pass filter comprising a pair of spaced ground planes, a network of spaced parallel digits disposed between the ground planes, the digits of the network having their corresponding ends short circuited to ground and their opposite ends open circuited to form a comb line, a network of lumped capacitors, each digit having its open circuited end coupled to ground by a different capacitor of the network, and each adjacent pair of digits being coupled at their open circuited ends by a different capacitor of the network.

2. The band-pass filter according to claim 1 wherein the digits of the comb line are less than an eighth of a wavelength in circuited compared to the wavelength at the filter's mid-band frequency.

3. The band-pass filter according to claim 2 further including an input and an output capacitor, each capacitor being connected to the open circuited end of a different one of the terminal digits in the comb line.